(12) United States Patent
Fan

(10) Patent No.: US 12,230,844 B2
(45) Date of Patent: Feb. 18, 2025

(54) SAFETY LAYER FOR BATTERY CELLS

(71) Applicant: American Lithium Energy Corporation, Carlsbad, CA (US)

(72) Inventor: Jiang Fan, San Diego, CA (US)

(73) Assignee: American Lithium Energy Corporation, Carlsbad, CA (US)

( * ) Notice: Subject to any disclaimer, the term of this patent is extended or adjusted under 35 U.S.C. 154(b) by 428 days.

(21) Appl. No.: 17/255,356

(22) PCT Filed: Jun. 25, 2019

(86) PCT No.: PCT/US2019/039054
§ 371 (c)(1),
(2) Date: Dec. 22, 2020

(87) PCT Pub. No.: WO2020/005988
PCT Pub. Date: Jan. 2, 2020

(65) Prior Publication Data
US 2021/0376432 A1 Dec. 2, 2021

Related U.S. Application Data

(60) Provisional application No. 62/689,746, filed on Jun. 25, 2018.

(51) Int. Cl.
*H01M 50/581* (2021.01)
*H01M 4/66* (2006.01)
*H01M 50/574* (2021.01)

(52) U.S. Cl.
CPC ......... *H01M 50/581* (2021.01); *H01M 4/667* (2013.01); *H01M 50/574* (2021.01); *H01M 2200/10* (2013.01)

(58) Field of Classification Search
CPC ... H01M 4/667; H01M 50/571; H01M 50/584
See application file for complete search history.

(56) References Cited

U.S. PATENT DOCUMENTS 2,664,481 A 12/1953 Pearl et al.
4,075,400 A 2/1978 Fritts
(Continued)

FOREIGN PATENT DOCUMENTS

CN 1121264 A 4/1996
CN 103194161 A 7/2013
(Continued)

OTHER PUBLICATIONS

Eichstadt, Amy E., et al. "Structure-Property Relationships for a Series of Amorphous Partially Aliphatic Polyimides." *Journal of Polymer Science Part B: Polymer Physics* 40.14 (2002): 1503-1512.
(Continued)

*Primary Examiner* — Scott J. Chmielecki
(74) *Attorney, Agent, or Firm* — Jones Day

(57) ABSTRACT

A battery may include a first electrode and a second electrode having an opposite polarity as the first electrode. The battery may further include a first current collector electrically coupled with the first electrode and a second current collector electrically coupled with the second electrode. A safe layer may be interposed between the first electrode and first current collector. The safe layer may be configured to respond to being exposed to a first temperature by interrupting a current flow in the battery cell. The safe layer may interrupt the current flow in the battery cell by forming a non-conductive gap between the first electrode and the first current collector. The safe layer may include a first polymer instead of a second polymer such that the safe layer interrupts the current flow in response to the first temperature and not a second temperature.

5 Claims, 5 Drawing Sheets

(56) References Cited

U.S. PATENT DOCUMENTS

| | | | |
|---|---|---|---|
| 4,361,799 A | 11/1982 | Lutz | |
| 4,456,631 A | 6/1984 | Crosbie et al. | |
| 4,541,735 A | 9/1985 | Abu-Isa | |
| 4,975,341 A | 12/1990 | Tucholski et al. | |
| 5,188,909 A | 2/1993 | Pedicini | |
| 5,504,128 A | 4/1996 | Mizutani et al. | |
| 5,507,842 A | 4/1996 | Fiorino | |
| 5,754,090 A | 5/1998 | Arensmeier | |
| 5,776,627 A | 7/1998 | Mao et al. | |
| 6,005,469 A | 12/1999 | Kalapodis et al. | |
| 6,078,244 A | 6/2000 | Quinn et al. | |
| 6,084,501 A | 7/2000 | Plasko | |
| 6,181,545 B1 | 1/2001 | Amatucci et al. | |
| 6,191,679 B1 | 2/2001 | Kalapodis et al. | |
| 6,235,426 B1* | 5/2001 | Yanai | H01M 50/538 429/324 |
| 6,342,826 B1 | 1/2002 | Quinn et al. | |
| 6,387,570 B1 | 5/2002 | Nakamura et al. | |
| 6,570,749 B1 | 5/2003 | Ling et al. | |
| 6,576,373 B1 | 6/2003 | Iwamoto et al. | |
| 6,780,544 B2 | 8/2004 | Noh | |
| 7,203,049 B2 | 4/2007 | Chu et al. | |
| 7,390,589 B2 | 6/2008 | Shin et al. | |
| 8,021,788 B2 | 9/2011 | Kim et al. | |
| 8,754,740 B2 | 6/2014 | Pinto et al. | |
| 8,841,011 B2 | 9/2014 | Jang | |
| 9,627,722 B1 | 4/2017 | Fan et al. | |
| 9,806,382 B1 | 10/2017 | Fan et al. | |
| 9,978,479 B2* | 5/2018 | Fields | C08K 3/08 |
| 11,626,220 B2* | 4/2023 | Li | H01C 1/028 338/22 R |
| 2002/0197533 A1 | 12/2002 | Gao et al. | |
| 2005/0079422 A1 | 4/2005 | Ko et al. | |
| 2006/0083984 A1* | 4/2006 | Oh | H01M 10/052 428/461 |
| 2006/0099506 A1 | 5/2006 | Krause et al. | |
| 2007/0166609 A1 | 7/2007 | Lee et al. | |
| 2007/0210893 A1 | 9/2007 | Hasunuma et al. | |
| 2007/0269718 A1 | 11/2007 | Krause et al. | |
| 2008/0116423 A1 | 5/2008 | Fan et al. | |
| 2008/0241684 A1* | 10/2008 | Muraoka | H01M 10/0587 427/58 |
| 2008/0254343 A1 | 10/2008 | Kaplin et al. | |
| 2008/0292939 A1 | 11/2008 | Xie | |
| 2009/0027158 A1 | 1/2009 | Kajino et al. | |
| 2009/0092892 A1 | 4/2009 | Yamaguchi et al. | |
| 2009/0191463 A1 | 7/2009 | Ide et al. | |
| 2010/0047674 A1 | 2/2010 | Ryu et al. | |
| 2010/0099022 A1 | 4/2010 | Nishida et al. | |
| 2010/0143753 A1 | 6/2010 | Kim et al. | |
| 2010/0167107 A1 | 7/2010 | Byun et al. | |
| 2010/0233543 A1 | 9/2010 | Numata et al. | |
| 2010/0247987 A1 | 9/2010 | Holung et al. | |
| 2011/0027658 A1* | 2/2011 | Kim | H01M 50/434 427/508 |
| 2011/0045321 A1 | 2/2011 | Park et al. | |
| 2011/0052950 A1 | 3/2011 | Yoo | |
| 2011/0117403 A1 | 5/2011 | Hermann et al. | |
| 2011/0151293 A1 | 6/2011 | Kim et al. | |
| 2011/0157755 A1 | 6/2011 | Honkura | |
| 2011/0217589 A1 | 9/2011 | Kobayashi et al. | |
| 2011/0256443 A1 | 10/2011 | Park et al. | |
| 2011/0273807 A1 | 11/2011 | Kim et al. | |
| 2011/0273809 A1 | 11/2011 | Falsett et al. | |
| 2011/0300421 A1* | 12/2011 | Iritani | H01M 10/615 429/120 |
| 2012/0056709 A1 | 3/2012 | Kajino et al. | |
| 2012/0058375 A1 | 3/2012 | Tanaka et al. | |
| 2012/0068127 A1 | 3/2012 | Kawase et al. | |
| 2012/0121974 A1 | 5/2012 | Tikhonov et al. | |
| 2012/0189881 A1 | 7/2012 | Geoffroy et al. | |
| 2013/0004811 A1 | 1/2013 | Banerjee et al. | |
| 2013/0101869 A1 | 4/2013 | Farmer | |
| 2013/0130075 A1* | 5/2013 | Kim | H01M 4/366 429/62 |
| 2013/0171502 A1 | 7/2013 | Chen et al. | |
| 2013/0216867 A1 | 8/2013 | Schaefer et al. | |
| 2014/0051826 A1* | 2/2014 | Chang | C08G 61/124 528/367 |
| 2014/0072851 A1 | 3/2014 | Oh et al. | |
| 2014/0168845 A1 | 6/2014 | Charles | |
| 2014/0178753 A1 | 6/2014 | Chu et al. | |
| 2014/0295248 A1 | 10/2014 | Hotta et al. | |
| 2014/0377629 A1 | 12/2014 | Miyazaki et al. | |
| 2015/0004448 A1 | 1/2015 | Morita et al. | |
| 2015/0050544 A1 | 2/2015 | Nam et al. | |
| 2015/0104681 A1 | 4/2015 | Wang et al. | |
| 2015/0280241 A1 | 10/2015 | Hara et al. | |
| 2015/0303484 A1 | 10/2015 | Iida et al. | |
| 2015/0311001 A1 | 10/2015 | Kato et al. | |
| 2016/0059732 A1 | 3/2016 | Loftus | |
| 2016/0149196 A1* | 5/2016 | Fan | H01M 10/4235 429/61 |
| 2016/0149199 A1 | 5/2016 | Fan | |
| 2016/0149268 A1 | 5/2016 | Fan et al. | |
| 2016/0149269 A1 | 5/2016 | Fan et al. | |
| 2016/0164065 A1* | 6/2016 | Liu | H01M 50/414 429/61 |
| 2016/0172657 A1 | 6/2016 | Matsui et al. | |
| 2016/0181590 A1 | 6/2016 | Fan et al. | |
| 2016/0240836 A1 | 8/2016 | Aotani et al. | |
| 2016/0254545 A1 | 9/2016 | Sugita et al. | |
| 2016/0254572 A1 | 9/2016 | Yu et al. | |
| 2016/0268646 A1 | 9/2016 | Wang et al. | |
| 2016/0322641 A1 | 11/2016 | Saito et al. | |
| 2016/0365613 A1 | 12/2016 | Fan | |
| 2016/0372749 A1 | 12/2016 | Iida et al. | |
| 2016/0380307 A1 | 12/2016 | Akita et al. | |
| 2017/0069904 A1 | 3/2017 | Ishihara et al. | |
| 2017/0207440 A1 | 7/2017 | Hama et al. | |
| 2017/0244093 A1* | 8/2017 | Fan | H01M 4/1395 |
| 2017/0278600 A1* | 9/2017 | Tanaka | H01C 1/1406 |
| 2017/0317333 A1* | 11/2017 | Seymour | H01M 10/0445 |
| 2017/0365840 A1 | 12/2017 | Fan et al. | |
| 2018/0019505 A1 | 1/2018 | Fan et al. | |
| 2018/0026301 A1* | 1/2018 | Ebisuzaki | H01M 4/587 429/245 |
| 2018/0053928 A1 | 2/2018 | Xie et al. | |
| 2018/0166817 A1* | 6/2018 | Sakaguchi | H01M 8/004 |
| 2018/0190967 A1 | 7/2018 | Fan et al. | |
| 2018/0226679 A1* | 8/2018 | Pan | H01M 4/364 |
| 2018/0294472 A1 | 10/2018 | Fan | |
| 2018/0315988 A1 | 11/2018 | Fan | |
| 2019/0013553 A1 | 1/2019 | Fan et al. | |
| 2019/0027796 A1* | 1/2019 | Matus | H01M 10/637 |
| 2019/0058198 A1 | 2/2019 | Fan et al. | |
| 2019/0081315 A1 | 3/2019 | Morin et al. | |
| 2021/0313627 A1 | 10/2021 | Fan et al. | |
| 2023/0282918 A1* | 9/2023 | Liang | H01M 50/24 429/100 |

FOREIGN PATENT DOCUMENTS

| | | |
|---|---|---|
| CN | 104078276 A | 10/2014 |
| CN | 104937320 A | 9/2015 |
| CN | 105140075 A | 12/2015 |
| CN | 105304409 A | 2/2016 |
| CN | 105680086 A | 6/2016 |
| CN | 106030751 A | 10/2016 |
| EP | 0450549 A1 | 10/1991 |
| EP | 0776058 A2 | 5/1997 |
| EP | 1246280 A2 | 10/2002 |
| JP | 7220755 A | 8/1995 |
| JP | H07-220755 A | 8/1995 |
| JP | H09-320568 A | 12/1997 |
| JP | 2000-077061 A | 3/2000 |
| JP | 2005-011540 A | 1/2005 |
| JP | 2007-280803 A | 10/2007 |
| JP | 2010-146726 A | 7/2010 |
| JP | 2012-074359 A | 4/2012 |
| KR | 20130123492 A | 11/2013 |

(56) References Cited

FOREIGN PATENT DOCUMENTS

| TW | 200601656 A | 1/2006 |
| WO | WO-2004/049494 A1 | 6/2004 |
| WO | WO-2015/046469 A1 | 4/2015 |
| WO | WO-2015/060175 A1 | 4/2015 |
| WO | WO-2016/086184 A1 | 6/2016 |

OTHER PUBLICATIONS

Fang, Xingzhong, et al. "Synthesis and properties of polyimides derived from cis-and trans-1, 2, 3, 4-cyclohexanetetracarboxylic dianhydrides." *Polymer* 45.8 (2004): 2539-2549.

Fisher, D.J. (2018) "Negative Thermal Expansion Materials." Jan. 15, 2018, Materials Research Forum LLC, p. 7, p. 86. 11 pages.

International Search Report and Written Opinion issued in International Application No. PCT/2015/062767, mailed Feb. 12, 2016. 14 pages.

Jeon, Jong-Young, and Tae-Moon Tak. "Synthesis of Aliphatic-Aromatic Polyimides by Two-Step Polymerization of Aliphatic Dianhydride and Aromatic Diamine." *Journal of Applied Polymer Science* 60.11 (1996): 1921-1926.

Loncrini, D. F., and J. M. Witzel. "Polyaryleneimides of meso-and dl-1, 2, 3, 4-Butanetetracarboxylic Acid Dianhydrides." *Journal of Polymer Science Part A-1: Polymer Chemistry* 7.8 (1969): 2185-2193.

Matsumoto, Toshihiko. "Aliphatic polyimides derived from polyalicyclic monomers." *High Performance Polymers* 13.2 (2001): S85-S92.

Schab-Balcerzak, E., et al. "Synthesis and characterization of organosoluble aliphatic-aromatic copolyimides based on cycloaliphatic dianhydride." *European Polymer Journal* 38.3 (2002): 423-430.

Seino, Hiroshi, Amane Mochizuki, and Mitsuru Ueda. "Synthesis of Aliphatic Polyimides Containing Adamantyl Units." *Journal of Polymer Science Part A Polymer Chemistry* 37.18 (1999): 3584-3590.

Seino, Hiroshi, et al. "Synthesis of fully aliphatic polyimides." *High Performance Polymers* 11.3 (1999): 255-262.

Spotnitz, R., and J. Franklin. "Abuse behavior of high-power, lithium-ion cells." *Journal of Power Sources* 113.1 (2003): 81-100.

\* cited by examiner

SAFETY LAYER FOR BATTERY CELLS

CROSS REFERENCE TO RELATED APPLICATION

This application is a national stage entry of Patent Cooperation Treaty Application No. PCT/US2019/039054 filed Jun. 25, 2019, entitled "SAFETY LAYER FOR BATTERY CELLS," which claims priority to U.S. Provisional Patent Application No. 62/689,746, filed on Jun. 25, 2018 and entitled "SYSTEM AND METHOD FOR MANUFACTURING BATTERY SAFE LAYER," the disclosure of which is incorporated herein by reference in its entirety.

TECHNICAL FIELD

The subject matter described herein relates generally to battery cells and more specifically to techniques for manufacturing safe layers for use in battery cells.

BACKGROUND

A battery cell can overcharge, overheat, and/or short circuit during operation. For example, an overcurrent can occur when the battery cell is overcharged and/or develops an internal short circuit. Overcurrent can cause irreversible damage to the battery cell. In particular, overcurrent can lead to thermal runaway, a hazardous condition in which undissipated heat from the overheating battery cell accelerates exothermic reactions within the battery cell to further increase the temperature of the battery. The consequences of thermal runaway can be especially dire including, for example, fire, explosions, and/or the like.

SUMMARY

Systems, methods, and articles of manufacture, including batteries and battery components, are provided. In some implementations of the current subject matter, there is provided a battery cell. The battery cell may include: a first electrode; a second electrode having an opposite polarity as the first electrode; a first current collector electrically coupled with the first electrode; a second current collector electrically coupled with the second electrode; and a safe layer interposed between the first electrode and first current collector, the safe layer configured to respond to being exposed to a target temperature by at least interrupting a current flow in the battery cell, the safe layer interrupting the current flow in the battery cell by at least forming a non-conductive gap between the first electrode and the first current collector, and the safe layer comprising a polymer selected based at least on the target temperature.

In some variations, one or more features disclosed herein including the following features can optionally be included in any feasible combination. The polymer may include one or more sidechains selected based at least on the target temperature. The polymer may include a first sidechain instead of a second sidechain such that the safe layer interrupts the current flow in response to a first temperature and not a second temperature.

In some variations, the safe layer may include a first polymer instead of a second polymer such that the safe layer interrupts the current flow in response to a first temperature and not a second temperature. The safe layer may be formed from the first polymer instead of the second polymer in order to increase or decrease a temperature at which the safe layer forms the non-conductive layer to interrupt the current flow in the battery cell. The safe layer may further include a first quantity of the first polymer instead of a second quantity of the first polymer such that the safe layer interrupts the current flow in response to the first temperature and not a second temperature.

In some variations, the safe layer may be further configured to interrupt the current flow in the battery cell in response to being exposed to a first voltage. The safe layer may include the first polymer instead of the second polymer such that the safe layer interrupts the current flow in response to the first voltage and not a second voltage.

In some variations, the polymer may include a poly (methyl methacrylate) such that the safe layer interrupts the current flow at a temperature of 255° C.

In some variations, the polymer may include a polypropylene such that the safe layer interrupts the current flow at a temperature of 248° C.

In some variations, the polymer may include a polyethylene such that the safe layer interrupts the current flow at a temperature of 217° C.

In some variations, the polymer may include a poly (vinyl alcohol) such that the safe layer interrupts the current flow at a temperature of 64° C.

In some variations, the polymer may include a poly (vinyl chloride) such that the safe layer interrupts the current flow at a temperature of 83° C.

In some variations, the polymer may include a poly (vinylidene fluoride) such that the safe layer interrupts the current flow at a temperature of 355° C.

In some variations, the polymer may include a polystyrene and/or a polysulphones such that the safe layer interrupts the current flow at a temperature of 302° C.

In some variations, the polymer may include a poly butadiene such that the safe layer interrupts the current flow at a temperature of 327° C.

In some variations, the polymer may include a nylon 6-6 such that the safe layer interrupts the current flow at a temperature of 342° C.

In some variations, the polymer may include a poly (1,4 phenylene sulfide) such that the safe layer interrupts the current flow at a temperature of 502° C.

In some variations, the polymer may include a polyhedral oligomeric silsesquioxane (POSS). The polymer may include a glycidyl polyhedral oligomeric silsesquioxane (EP0409), a methacryl polyhedral oligomeric silsesquioxane (MA0735), a TrisilanolPhenyl polyhedral oligomeric silsesquioxane (SO1458), and/or a OctaMaleamic Acid polyhedral oligomeric silsesquioxane (CA0298).

In some variations, the polymer may include a conductive polymer. The conductive polymer may be a polyacetylene, a polypyrrole, a polyindole, a polyaniline, a poly(p-phenylene vinylene), and/or a poly(3-alkylthiophenes).

In another aspect, there is provided a method for forming a safe layer. The method may include: forming a safe layer by coating, spraying, and/or depositing one or more materials forming the safe layer. The safe layer may be configured to be interposed between an electrode and a current collector electrically coupled with the electrode. The safe layer may be further configured to respond to being exposed to a target temperature by at least interrupting a current flow in a battery cell comprising the electrode, the current collector, and the safe layer. The safe layer may interrupt the current flow in the battery cell by at least forming a non-conductive gap between the electrode and the current collector. The one or more materials forming the safe layer may include a polymer selected based at least on the target temperature.

In some variations, one or more features disclosed herein including the following features can optionally be included in any feasible combination. The safe layer may include a first polymer instead of a second polymer such that the safe layer interrupts the current flow in response to a first temperature and not a second temperature.

In some variations, the polymer may include one or more sidechains selected based at least on the target temperature. The polymer may include a first sidechain instead of a second sidechain such that the safe layer interrupts the current flow in response to a first temperature and not a second temperature.

In some variations, the one or more materials forming the safe layer may be coated, sprayed, and/or deposited on a metal foil.

In some variations, the electrode may be formed by at least coating the safe layer with one or more materials comprising the electrode.

In some variations, the safe layer may be treated to at least crosslink a plurality of polymer chains comprising the safe layer.

In some variations, the safe layer may be subjected to a heat treatment. The safe layer may be heat treated at 150° C. for 16 hours. The safe layer may be heat treated under vacuum In some variations, the safe layer may be subjected to a chemical treatment.

In some variations, the safe layer may be subjected to a radiation treatment including by being exposed to an ultra-violet (UV) light, a β-ray, and/or an X-ray.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

A battery cell can include at least one safe layer to mitigate and/or eliminate the operational hazards of the battery cell including, for example, overcharging, overheating, short-circuiting, and/or the like. As noted, the overcharging, overheating, and/or short-circuiting of the battery cell can lead to thermal runaway, a dangerous condition in which the battery cell undergoes a precipitous increase in temperature. Accordingly, the safe layer can be configured to respond to an increase in temperature by interrupting a flow of current within the battery cell. For example, when the battery cell is exposed to temperatures exceeding a threshold value, the safe layer can undergo a phase transition that causes the safe layer to expand and/or contract. The expansion and/or contraction of the safe layer can cause an electric decoupling within the battery cell, for example, between an electrode of the battery cell and a corresponding current collector. It should be appreciated that the electric decoupling can interrupt the flow of current within the battery cell, thereby arresting exothermic reactions within the battery cell and any further increase in the temperature of the battery cell.

Figure 1:
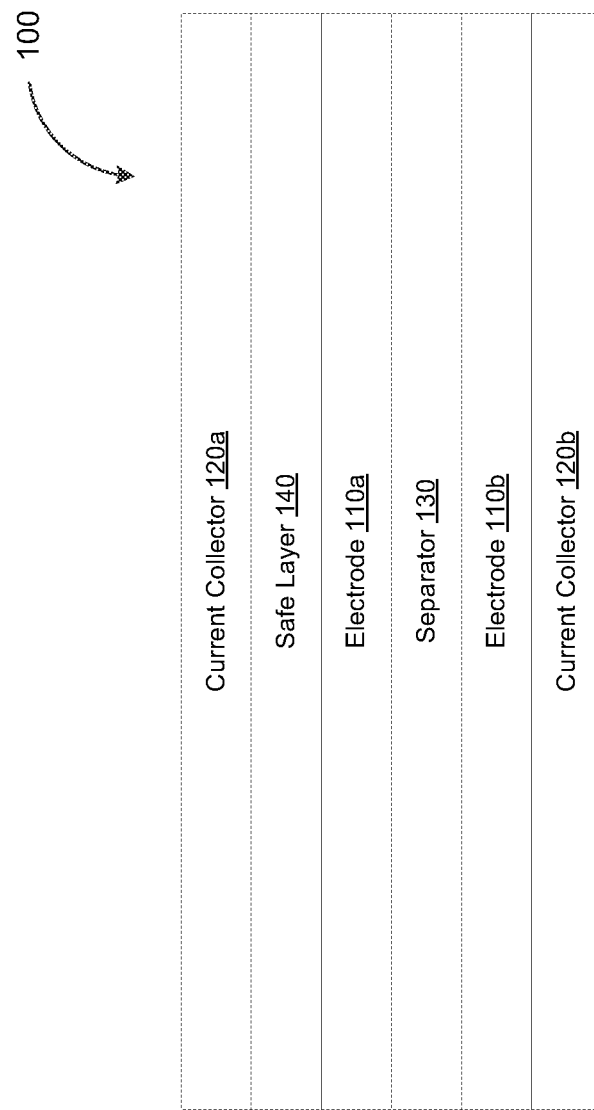
FIG. 1 depicts a schematic diagram illustrating an example of a battery cell consistent with implementations of the current subject matter.

FIG. 1 depicts a schematic diagram illustrating an example of a battery cell 100 consistent with implementations of the current subject matter. The battery cell 100 may be any type of battery cell including, for example, a metal battery (e.g., a lithium (Li) battery, sodium (Na) battery and/or the like), a metal ion battery (e.g. lithium (Li) ions, sodium (Na) ions, and/or the like), an ionic liquid or solid state electrolyte based battery, a water-based battery (aqueous solution electrolyte), and/or the like. Referring to FIG. 1, the battery cell 100 may include a first electrode 110a and a second electrode 110b. The first electrode 110a and the second electrode 110b may have opposite polarities. For example, the first electrode 110a may be a cathode of the battery cell 100 while the second electrode 110b may be an anode of the battery cell. As shown in FIG. 1, the first electrode 110a may be electrically coupled with a first current collector 120a while the second electrode 110b electrically coupled with a second current collector 120b. Moreover, as shown in FIG. 1, the battery cell 100 may include a separator 130 interposed between the first electrode 110a and the second electrode 110b. Although not shown, it should be appreciated that the battery cell 100 may include one or more electrolytes including, for example, liquid electrolytes, solid state electrolytes, and/or the like.

Referring again to FIG. 1, the battery cell 100 may include one or more safe layers including, for example, a safe layer 140 interposed between the first electrode 110a and the first current collector 120a. The safe layer 140 may be electrically conductive due to the inclusion of one or more conductive materials including, for example, carbon black, nano carbon tubes, graphene, and/or the like. It should be appreciated that the safe layer 140 may be interposed between the second electrode 110b and the second current collector 120b instead of the first electrode 110a and the first current collector 120b. Moreover, the battery cell 100 may also include additional safe layers including, for example, another safe layer interposed between the second electrode 110b and the second current collector 120b in addition to the safe layer 140 interposed between the first electrode 110*a* and the first current collector 120*b*.

The safe layer 140 may be configured to interrupt current flow within the battery cell 100 when the battery cell 100 is subject to a temperature, voltage, and/or current that exceeds a threshold value, thereby mitigating the hazards that arise when the battery cell 100 is overcharged, overheated, and/or develops an internal short circuit. In some implementations of the current subject matter, the safe layer 140 may interrupt current flow within the battery cell 100 by at least forming a nonconductive gap between the first electrode 110*a* and the first current collector 120*a*. For example, the safe layer 140 may form the nonconductive gap by at least expanding and/or contracting in response to the battery cell 100 being exposed to an above-threshold temperature, voltage, and/or current. Alternatively and/or additionally, the safe layer 140 may interrupt current flow within the battery cell 100 by at least forming a high-resistance gap between the first electrode 110*a* and the first current collector 120*a*. For instance, the safe layer 140 may form the high-resistance gap by at least undergoing an increase in electrical resistivity in response to the battery cell 100 being exposed to an above-threshold temperature, voltage, and/or current.

According to some implementations of the current subject matter, to form a nonconductive gap between the first electrode 110*a* and the first current collector 120*a*, the safe layer 140 may generate a gas and/or a liquid that vaporizes to form the gas. The nonconductive gap between the first electrode 110*a* and the first current collector 120*a* may be formed when the gas separates the current collector 100 from the corresponding electrode. Alternatively and/or additionally, the safe layer 140 may decompose and/or delaminate in order to form the nonconductive gap between the first electrode 110*a* and the first current collector 120*a*. For example, a lithium salt in the electrolyte of the battery cell 100 may respond an above threshold temperature and/or voltage by at least decomposing to form one or more reactants that trigger a decomposition and/or delamination of the safe layer 140. For instance, lithium hexafluorophosphate ($LiPF_6$) in the electrolyte of the battery cell 150 may decompose to form hydrofluoric acid, which may further react with a carbonate (e.g., calcium carbonate ($CaCO_3$)) in the safe layer 140 to form a fluoride (e.g., calcium fluoride ($CaF_2$)) and carbon dioxide ($CO_2$) gas. As another example, lithium tetrafluoroborate ($LiBF_4$) in the electrolyte of the battery cell 100 may decompose to form lithium fluoride (LiF) and boron trifluoride ($BF_3$) gas. The terphenyl (e.g., ortho-terphenyl) included in the electrolyte may further react with the safe layer 140 by at least polymerizing with polymers and/or terphenyl analogs (e.g., para-terphenyl) included in the safe layer 140.

In some implementations of the current subject matter, the composition of the safe layer 140 may be varied in order to suit the application associated with the battery cell 100. For example, the composition of the safe layer 140 may be varied in order to achieve a target temperature and/or a target voltage at which the safe layer 140 interrupts current flow within the battery cell 100. That is, the composition of the safe layer 140 may be varied such that the safe layer 140 interrupt current flow within the battery cell 100 at a temperature and/or a voltage suitable for the application associated with the battery cell 100.

In some implementations of the current subject matter, the safe layer 140 may be formed from one or more polymers. Each molecule (e.g., macromolecule) of a polymer may include a backbone chain, which may be a longest series of covalently bonded atoms forming a continuous chain of the molecule. Furthermore, each molecule of the polymer may include one or more sidechains, which may be attached to the backbone chain via ionic bonds or covalent bonds. It should be appreciated that different polymers within a same family of polymers may include the same backbone chain but one or more different sidechains.

As shown in Table 1 below, different families of polymers may exhibit different thermal decomposition temperatures and/or electrochemical decomposition voltages. Moreover, different polymers within the same family of polymers may exhibit different thermal decomposition temperatures and/or electrochemical decomposition voltages depending on the sidechains associated with each polymer. It should be appreciated that the thermal decomposition temperature of a polymer is typically directly proportional to the electrochemical decomposition voltage of the polymer. That is, a polymer exhibiting a low thermal decomposition temperature may also exhibit a low electrochemical decomposition voltage.

Different polymers may decompose at different temperatures and/or voltages due to a number of structural factors (e.g., variations in backbone chains, end groups, sidechains, crosslinking groups, and/or the like) and/or environmental factors (e.g., oxidation environment, corrosive environment, and/or the like). For example, different polymers may include different sidechains including, for example, triphenyl phosphite or analogs, biphenyl or O-terphenyl or its derivatives, phenyl-R-phenyl, 2,5-Di-tert-butyl-1, 4-bis (2-methoxyethoxy) benzene, cyclohexyl benzene, dimethoxydiphenyl silane or its analogs, vinyl carbonate, and/or the like. A polymer with a stronger sidechain may exhibit a higher thermal decomposition temperature and/or electrochemical decomposition voltage than a polymer with a weaker sidechain. As used herein, the strength of the sidechain of a polymer may correspond to a quantity of energy required to detach the sidechain from the backbone chain of the polymer. For example, a covalently bonded sidechain may be stronger than an ionically bonded sidechain such that a polymer with a covalently-bonded sidechain may exhibit a higher thermal decomposition temperature and/or electrochemical decomposition voltage than a polymer with an ionically-bonded sidechain.

Alternatively and/or additionally, different crosslinking agents may be added to a polymer including, for example, derivatives of ethylene glycol di(meth)acrylate, derivatives of methyl enebisacrylamide, formaldehyde-free cross linking agents, divinylbenzene, and/or the like. Accordingly, the temperature and the voltage at which the safe layer 140 undergoes decomposition may be adjusted by at least varying the types and/or proportions of the one or more polymers forming the safe layer 140 including, for example, the sidechains and/or the crosslinking agents included in the polymers forming the safe layer 140.

For example, as shown in Table 1, the safe layer 140 may include poly(1,4 phenylene sulfide) and/or a higher proportion of poly(1,4 phenylene sulfide) in order to increase the temperature and/or voltage at which the safe layer 140 decomposes. Alternatively, the safe layer 140 may include poly (vinyl alcohol) and/or a higher proportion of poly (vinyl alcohol) in order to decrease the temperature and/or voltage at which the safe layer 140 decomposes. It should be appreciated that a variety of gases may be generated during the decomposition of the safe layer 140 formed from one or more polymers including, for example, hydrogen ($H_2$), methane ($CH_4$), carbon monoxide (CO), carbon dioxide ($CO_2$), and/or the like. As noted, the safe layer 140 may generate the gas in order to form a nonconductive gap between the first electrode 110a and the first current collector 120a.

TABLE 1

| Polymer | Decomposition Temp. | Group effect |
|---|---|---|
| Poly (methyl methacrylate) | 528 K (255° C.) | |
| Polypropylene | 521 K (248° C.) | |
| Polyethylene | 490 K (217° C.) | |
| Poly (vinyl alcohol) | 337 K (64° C.) | Presence of hydro oxide group reduces decomposition temperature |
| Poly (vinyl chloride) | 356 K (83° C.) | Presence of chloride reduces decomposition temperature |
| Poly (vinylidene fluoride) | 628 K (355° C.) | Presence of fluoride increases decomposition temperature |
| Polystyrene | 575 K (302° C.) | |
| Poly butadiene | 600 K (327° C.) | |
| Nylon 6-6 | 615 K (342° C.) | |
| Poly(1,4 phenylene sulfide) | 775 K (502° C.) | |
| Polysulphones | 575 K (302° C.) | |

In some implementations of the current subject matter, the safe layer 140 may be formed from one or more types of polyhedral oligomeric silsesquioxanes (POSS). The one or more types of polyhedral oligomeric silsesquioxane (POSS) may incorporated into the one or more polymers forming the safe layer 140. Polyhedral oligomeric silsesquioxanes (POSS) may be class of nanostructured chemicals that bridges the gap between ceramic and organic materials. Accordingly, it should be appreciated that the inclusion of one or more types of polyhedral oligomeric silsesquioxanes (POSS) in the safe layer 140 may improve the performance of the safe layer 140 without any compromise to the mechanical properties of the safe layer 140. Some POSS may contain some side groups for adjusting thermal decomposition temperature and electrochemical decomposition temperature. For instance, POSS-PEG$_8$ has eight polyethylene glycol sidechains with a low glass transition temperature ($T_g$) as well as a low melting temperature ($T_m$) whereas POSS-benzyl$_7$(BF$_3$Li)$_3$ is a Janus-like POSS with hydrophobic phenyl groups and —Si—O—BF$_3$Li ionic groups clustered on one side the SiO$_{1.5}$ cube. Alternatively and/or additionally, aryl-containing lithium perfluorosulfonates may form family of salts having optimal electrochemical performances including high cation transference numbers. This family may be extended to include polysilsesquioxanes in which every silicon atom bears one lithium perfluorosulfonate group.

In some implementations of the current subject matter, the safe layer 140 may include a polymer such as polyphosphazenes with various sidechains including, for example, [N=P(OCH$_2$CF$_3$)$_2$]$_n$; [N=P(OCH$_2$CF$_3$)(OCH$_2$(CF$_2$)$_x$CF$_2$H]$_n$; [N=P(OC$_6$H$_5$)]$_n$; [N=P(OCH$_2$OCH$_2$CH$_2$OCH$_3$)$_2$]$_n$; [N=P(OC$_6$H$_4$COOLi)$_2$]$_n$, and/or the like. Various kinds of synthetic polymers may also be used to form the safe layer 140. The sidechains included in the synthetic polymers may be varied in order to achieve a target thermal decomposition temperature and/or a target electrochemical decomposition voltage at which the safe layer 140 interrupts current flow within the battery cell 100. Examples of synthetic polymers include styrene butadiene rubber (SBR)-based binders, polyvinylidene fluoride (PVDF)-based binders, carboxymethyl cellulose (CMC)-based binders, poly(acrylic acid) (PAA)-based binders, polyvinyl acids (PVA)-based binders, poly(vinylpyrrolidone) (PVP)-based binders, and/or the like.

In some implementations of the current subject matter, the safe layer 140 may include a conductive polymer. Examples of conductive polymers include linear-backbone "polymer blacks" (e.g., polyacetylene, polypyrrole, polyindole, polyaniline, and/or the like) and their copolymers, poly(p-phenylene vinylene) (PPV) and its derivatives, and poly(3-alkylthiophenes). To further illustrate, Table 2 below depicts examples of organic conductive polymers.

TABLE 2

| No Heteroatom | Nitrogen-containing | Sulfur-containing |
|---|---|---|
| Poly(fluorene)s | poly(pyrrole)s (PPY) | poly(pyrrole)s (PPY) |
| polyphenylenes | polycarbazoles | polycarbazoles |
| polypyrenes | polyindoles | polyindoles |
| polyazulenes | polyazepines | polyazepines |
| polynaphthalenes | polyanilines (PANI) | polyanilines (PANI) |
| Poly(acetylene)s (PAC) | | |
| Poly(p-phenylene vinylene) (PPV) | | |

In some implementations of the current subject matter, the safe layer 140 may include a positive thermal coefficient (PTC) material including, for example, polyethylene (PE) and carbon black, polyvinylidene fluoride (PVDF) and carbon black, an inorganic conductive ceramic (e.g., barium titanium oxide (BaTiO$_2$) and/or the like) and polyethylene (PE). Alternatively and/or additionally, the safe layer 140 may be formed from a binder and a compound that is configured to decompose in response to an above-threshold temperature, voltage, and/or current. The decomposition of the compound may result in the formation of the nonconductive gap and/or the high resistance gap between the first electrode 110a and the first current collector 120a.

In some implementations of the current subject matter, the safe layer 140 may be formed from a material that undergoes a solid-to-solid phase transition when subject to heat such as, for example, an inorganic conductive ceramic (e.g., barium titanium oxide (BaTiO$_2$) and/or the like), metal-like carbides (e.g., zirconium carbide (ZrC), titanium carbide (TiC), and/or the like), nitrides (e.g., titanium nitride (TiN), tantalum nitride (TaN), aluminum nitride (AlN), boron nitride (BN), and/or the like), and/or the like. It should be appreciated that the solid-to-solid phase transition, which may be triggered by exposure to heat, may be accompanied by a decrease in electrical conductivity. For example, when the safe layer 140 is formed from a doped and/or an undoped inorganic conductive ceramic (e.g., barium titanium oxide (BaTiO$_2$) and/or the like), which may be optionally combined with one or more oxides (e.g., titanium oxide (TiO$_2$) and/or the like) and/or carbonates (e.g., sodium carbonate (Na$_2$CO$_3$), potassium carbonate (K$_2$CO$_3$), calcium carbonate (CaCO$_3$), and/or the like), the safe layer 140 may become an insulator at temperatures above 130° C. Alternatively and/or additionally, when the safe layer 140 is formed from a metal-like carbide (e.g., zirconium carbide (ZrC), titanium carbide (TiC), and/or the like), the electrical conductivity of the safe layer 140 may initially be high (e.g., up to 10.5 siemens per centimeter (S/cm)) but may decrease as the safe layer 140 is subject to rising temperatures.

In some implementations of the current subject matter, the formation of the safe layer 140 may include subjecting the safe layer 140 to a treatment configured to crosslink the polymer chains forming the safe layer 140. For example, the safe layer 140 may be subject to a chemical treatment, heat treatment, and/or radiation treatment (e.g., exposure to ultraviolet (UV) light, β-ray, X-ray, and/or the like). FIGS. 3A-F depicts the effects of subjecting the safe layer 140 to a heat treatment. Table 3 below further summarizes the effects of subjecting the safe layer 140 to a heat treatment.

TABLE 3

| No. | Temperature (C. °) | Under vacuum | In air (no vaccum) | Comments |
|---|---|---|---|---|
| 1 | No treatment | N/A | N/A | Many Cracks |
| 2 | 125° C. for 10 min | | x | Some cracks |
| 3 | 240° C. for 10 min | | x | Less cracks |
| 4 | 240° C. for 30 min | | x | Less cracks |
| 5 | 150° C. for 16 hrs | x | | No cracks |

Figure 3A:
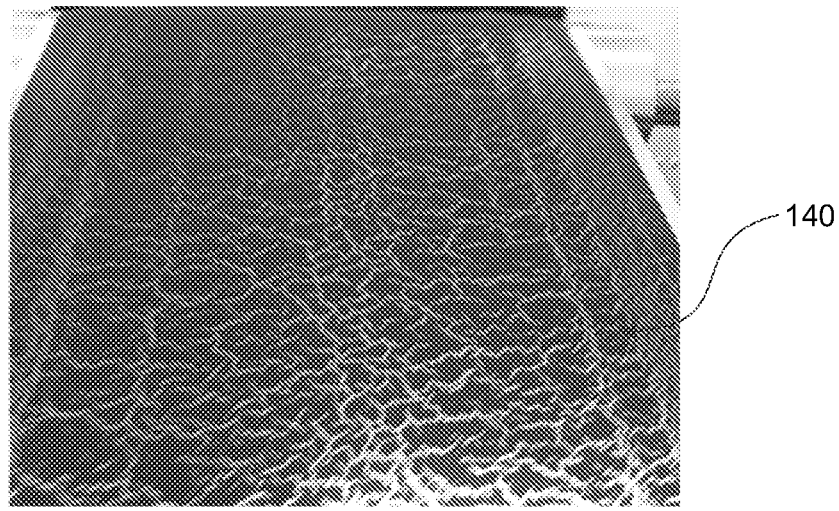
FIG. 3A depicts an example of an heat treated safe layer consistent with implementations of the current subject matter.
Figure 3B:
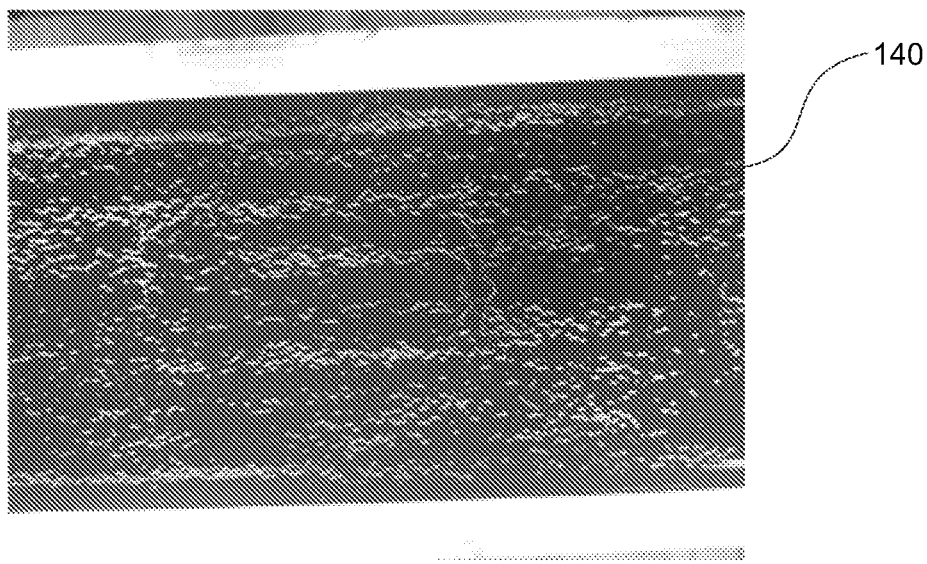
FIG. 3B depicts an example of a heat treated safe layer consistent with implementations of the current subject matter.
Figure 3C:
FIG. 3C depicts another example of a heat treated safe layer consistent with implementations of the current subject matter.
Figure 3D:
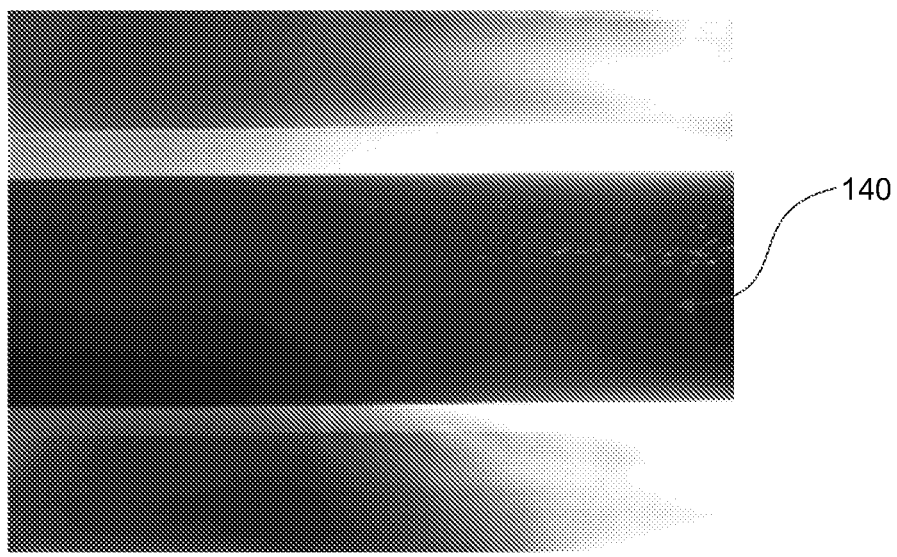
FIG. 3D depicts another example of a heat treated safe layer consistent with implementations of the current subject matter.

Subjecting the safe layer 140 to a treatment to crosslink the polymer chains forming the safe layer 140 may enhance the structural integrity of the safe layer 140. For example, as shown in FIG. 3A, the safe layer 140 without any heat treatment may exhibit cracks. By contrast, FIGS. 3B-F depict the effects of treating the safe layer 140 at different temperatures over various lengths of time, which may include a reduction in the quantity of cracks present in the safe layer 140. For instance, FIG. 3B depicts the safe layer 140 being heat treated at 125° C. for 10 minutes, FIG. 3C depicts the safe layer 140 being heat treated at 240° C. for 10 minutes, FIG. 3D depicts the safe layer 140 being heat treated at 240° C. for 30 minutes, and FIG. 3E depicts the safe layer 140 being heat treated at 150° C. for 16 hours under vacuum.

As shown in FIGS. 3B-F, treating the safe layer 140 at higher temperatures and/or over longer time periods may increase the structural integrity of the safe layer 140 including by decreasing the quantity of cracks present in the safe layer 140. For example, the safe layer 140 shown in FIG. 3C, which is heat treated at 240° C. for 10 minutes, may exhibit fewer cracks than the safe layer 140 heat treated at 125° C. for 10 minutes shown in FIG. 3B. Meanwhile, the safe layer 140 shown in FIG. 3D, which is heat treated at 240° C. for 30 minutes, may exhibit even fewer cracks than the safe layer 140 heat treated at 240° C. for 10 minutes shown in FIG. 3C. Nevertheless, as shown in FIG. 3E, treating the safe layer 140 at 150° C. for 16 hours and under vacuum may render the safe layer 140 crack-free.

Figure 2:
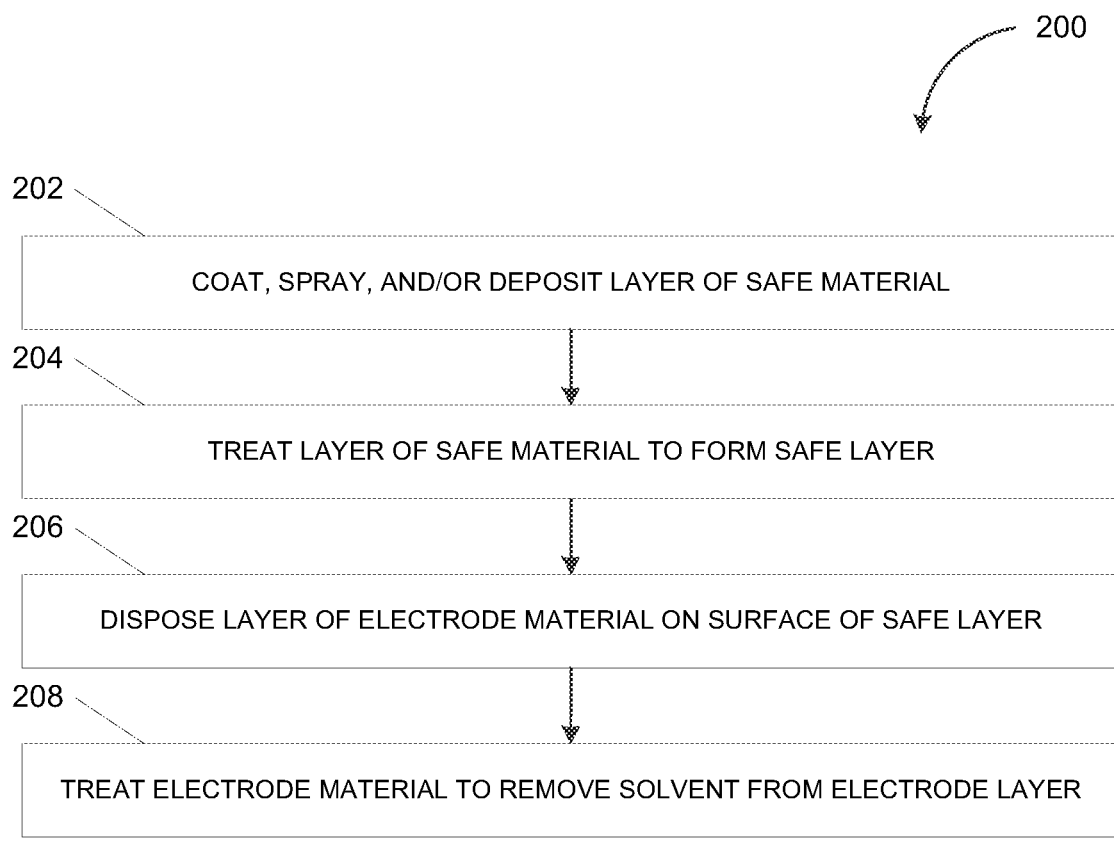
FIG. 2 depicts a flowchart illustrating a process for forming a safe layer consistent with implementations of the current subject matter.

FIG. 2 depicts a flowchart illustrating a process 200 for forming a safe layer consistent with implementations of the current subject matter. For example, the process 200 may be performed in order to forming the safe layer 140 including the first electrode 110a coupled with the safe layer 140. In some implementations of the current subject matter, the safe layer may be formed by coating, spraying, and/or depositing a layer of one or more materials forming the safe layer (202). For example, the safe layer may be formed by one or more coating technique including, for example, micro-gravure coating, slot die coating, reverse roll coating, and/or the like. Alternatively and/or additionally, the safe layer may be formed by one or more spraying and/or deposition techniques including, for example, vapor deposition, electron beam deposition, ion assistant deposition, atomic layer deposition, and/or the like. The formed safe layer may be subject to one or more treatments (204). For instance, the safe layer may be subject to a drying treatment to remove solvent and/or a cross-linking treatment to rigidify the one or more materials forming the safe layer. Alternatively and/or additionally, the safe layer may be subject to a chemical treatment, a heat treatment, and/or a radiation treatment (e.g., exposure to ultraviolet (UV) light, β-ray, X-ray, and/or the like). Heat treating the safe layer may enhance the structural integrity of the safe layer including by reducing the quantity of cracks present in the formed safe layer.

According to some implementations of the current subject matter, the safe layer of the battery cell can be formed together with an electrode layer of the battery cell. For instance, the safe layer 140 may be formed along with the first electrode 110a of the battery cell 100. As such, an electrode layer may be formed on the safe layer by at least disposing a layer of electrode material on a surface of the safe layer (206). For example, the electrode material can be disposed on the surface of the safe layer by one or more coating techniques including, for example, slot die coating, reverse roll coating, and/or the like. The formed electrode layer may be subject to a drying treatment in order to remove solvent from the electrode layer (208).

Example Safe Layer I

In some implementations of the current subject matter, the safe layer 140 may be formed by dissolving 1 gram of EP0409 (glycidyl polyhedral oligomeric silsesquioxane (POSS)) into 50 grams of tetrahydrofuran ($(CH_2)_3CH_2O$). Furthermore, 5 grams of poly acrylic monomer can be added to the EP0409 solution as well as 50 grams of nano-sized calcium carbonate ($CaCO_3$). The EP0409 solution can further be combined with 1 gram of a conductive additive (e.g., carbon black and/or the like) and 0.1 grams of an initiator (e.g., 2, 4, 6-trimethyl benzoyl-diphenyl Phosphine oxide). The resulting slurry can be coated onto a metal foil (e.g., 14 μm aluminium (Al) foil, 8 μm copper foil), or the like) with a loading of 0.7 miligrams per square centimeter ($mg/cm^2$). The coating may be performed by an automatic coater at a speed of 1.5 meters per minute. The automatic coater may include a first gravature coating header with three 2-meter long heating zones that are each set at approximately 60° C. and an ultraviolet (UV) light source positioned above the slurry being coated onto the metal foil to form the safe layer 140. The automatic coater may further include a second slot die coating header and heating zones for coating and drying a layer of the material forming the first electrode 110a, which may be deposited on a surface of the safe layer 140.

Alternatively, the safe layer 140 may subject to an ultraviolet (UV) light treatment subsequent to drying and before the first electrode 110a is applied to the surface of the safe layer 140 by a slot die coater. The slot die coater applying the first electrode 110° may include three heating zones set to the temperatures 90° C., 135° C., and 135° C.

Example Safe Layer II

In some implementations of the current subject matter, the safe layer 140 may be formed by dissolving 1 gram of MA0735 (methacryl polyhedral oligomeric silsesquioxane (POSS)) into 50 grams of tetrahydrofuran (THF) and mixing 5 grams of poly acrylic monomer into the resulting solution. Furthermore, 50 grams of nano sized CaCO3, 1 gram of a conductive additive (e.g., carbon black and/or the like), and 0.1 grams of an initiator can be added to MA0735 solution to form a slurry. The slurry can be coated onto aluminium (Al) foil with the loading 0.7 miligrams per square centimeter (e.g., $mg/cm^2$). A layer of a slurry forming the first electrode 110a may be coated on a surface of the safe layer 140. An ultraviolet (UV) light and a heating zone can be set up during the coating to treat the safe layer 140 and/or the first electrode 110a.

Example Safe Layer III

In some implementations of the current subject matter, the safe layer 140 may be formed by dissolving 0.8 grams TF-4000 into 8 grams of N-Methyl-2-pyrrolidone (NMP) to form a solution that is then combined with a solution formed by mixing 4.8 grams of polyvinylidene difluoride (PVDF) with 55 grams of N-Methyl-2-pyrrolidone (NMP). The resulting slurry can be mixed with 34.08 grams of nano calcium carbonate ($CaCO_3$) for 20 minutes at 5000 revolutions per minute. Furthermore, the slurry can be coated onto 15 millimeter thick aluminum (Al) foil using an automatic coating machine with a first heat zone set to approximately 135° C. and a second heat zone set to approximately 165° C. to remove the solvent N-Methyl-2-pyrrolidone (NMP) and form a dried solid with a loading of approximately 0.7 milligrams per square centimeter ($mg/cm^2$). According to some implementations of the current subject matter, a conductive additive (e.g., carbon black and/or the like) can be omitted from the slurry forming the safe layer 140. In such instances, the conductivity of the safe layer 140 may be derived from intermixing between the materials forming the safe layer 140 and the materials forming the first electrode 110a during the coating and/or the calendaring process.

In some implementations of the current subject matter, the first electrode 110a may be formed along with the safety layer 140. For instance, the first electrode 110a may be formed by dissolving 21.6 grams of polyvinylidene difluoride (PVDF) in 250 grams of the solvent N-Methyl-2-pyrrolidone (NMP) and adding 18 grams of a conductive additive (e.g., carbon black and/or the like) to the resulting solution. This slurry of polyvinylidene difluoride (PVDF), N-Methyl-2-pyrrolidone (NMP), and a conductive additive can be missed for 15 minutes at 5000 revolutions per minute before 560.4 grams of $LiNi_{1/3}Co_{1/3}Mn_{1/3}O_2$ (NMC) is added to the slurry and mixed for 30 minutes at 5000 revolutions per minute. The resulting slurry can then be coated on a surface of the safe layer 140, for example, using an automatic coating machine with a first heat zone set to approximately 85° C. and a second heat zone set to approximately 135° C. It should be appreciated that the slurry can be exposed to heat in order to remove the solvent N-Methyl-2-pyrrolidone (NMP) and form a dry solid with a loading of approximately 19.5 milligrams per square centimeter ($mg/cm^2$).

Example Safe Layer IV

In some implementations of the current subject matter, the safe layer 140 may include MA0735 (methacryl polyhedral oligomeric silsesquioxane (POSS)), which may be a hybrid molecule having an inorganic silsesquioxane at its core and one or more organic methacrylate groups attached at the corners of the cage. The safe layer 140 may be formed by dissolving 5 grams of the MA0735 into 100 grams of tetrahydrofuran (($CH_2)_3CH_2O$). Furthermore, 5 grams of polystyrene and 0.2 grams of carbon black may be added to the MA0735 solution and mixed at a high speed (e.g., >6000 revolutions per minute). The resulting slurry may be coated onto aluminium (Al) foil, for example, using a gravure coater, with of loading 0.3 miligrams per square centimeter ($mg/cm^2$). The resulting safe layer 140 may be subject to an ultraviolet (UV) light treatment before a layer of lithium cobalt oxide ($LiCoO_2$) forming the first electrode 110a is coated on a surface of the safe layer 140.

Example Safe Layer V

In some implementations of the current subject matter, the safe layer 140 may include SO1458 (TrisilanolPhenyl polyhedral oligomeric silsesquioxane (POSS)), which may be a hybrid molecule having an inorganic silsesquioxane at its core, organic phenyl groups attached at the corners of the cage, and three active silanol functionalities. The safe layer 140 may be formed by dissolving 5 grams of the SO1458 into 100 grams of tetrahydrofuran (($CH_2)_3CH_2O$) before adding 5 grams of polystyrene and 0.2 grams of carbon black. The solution may be mixed at a high speed (e.g., >6000 revolutions per minute) before the resulting slurry is coated onto aluminium (Al) foil, for example, using a gravure coater, with of loading 0.3 miligrams per square centimeter ($mg/cm^2$). The resulting safe layer 140 may be subject to an ultraviolet (UV) light treatment before a layer of lithium cobalt oxide ($LiCoO_2$) forming the first electrode 110a is coated on a surface of the safe layer 140.

Example Safe Layer VI

In some implementations of the current subject matter, the safe layer 140 may include CA0298 (OctaMaleamic Acid polyhedral oligomeric silsesquioxane (POSS)), which may be a hybrid molecule having an inorganic silsesquioxane at its core and organic OctaMaleamic acid groups attached at the corners of the cage. The safe layer 140 may be formed by dissolving 5 grams of the CA0298 into 100 grams of tetrahydrofuran (($CH_2)_3CH_2O$). Furthermore, 5 grams of poly (vinylidene fluoride) (PVDF) and 0.2 grams of carbon black may be added to the CA0298 solution and mixed at a high speed (e.g., >6000 revolutions per minute). The resulting slurry may be coated onto aluminium (Al) foil, for example, using a gravure coater, with of loading 0.3 miligrams per square centimeter ($mg/cm^2$). The resulting safe layer 140 may be subject to an ultraviolet (UV) light treatment before a layer of lithium cobalt oxide ($LiCoO_2$) forming the first electrode 110a is coated on a surface of the safe layer 140.

Example Safe Layer VII

In some implementations of the current subject matter, the safe layer 140 may include polyvinylidene fluoride (PVDF), which may increase the decomposition temperature of the safe layer 140. The formation of the safe layer 140 may include dissolving 94 grams of polyamide-imide (PAI) in 940 grams of N-Methyl-2-pyrrolidone (NMP) solvent. Meanwhile, 5 grams of polyvinylidene fluoride (PVDF) may be dissolved into 172.5 grams of N-Methyl-2-pyrrolidone (NMP) solvent. Furthermore, 1 gram of carbon black may be mixed with 200 grams of N-Methyl-2-pyrrolidone (NMP) solvent at 6000 revolutions per minute for three hours. The carbon black solution may be mixed for another three hours in an ultrasonic bath to maximize the homogeneity of the carbon black slurry. The polyamide-imide (PAI) solution, the polyvinylidene fluoride (PVDF) solution, and the carbon black solution may be combined and mixed at 6000 revolutions per minute for one hour. Once the resulting slurry is determined to exhibit an appropriate viscosity (e.g., as measured by a rheometer fitted with spindle no. 6 and set at 50 revolutions per minute), the slurry may be coated onto aluminum (Al) foil by an automatic coater at a rate of 2 meters per minute and with a target loading of 0.2 milligrams per square centimeter. The first drying zone, the second drying zone, and the sixth drying zone of the automatic coater may be set to 50° C. while the third drying zone, fourth drying zone, and fifth drying zone of the automatic coater may be set to 60° C.

Figure 3F:
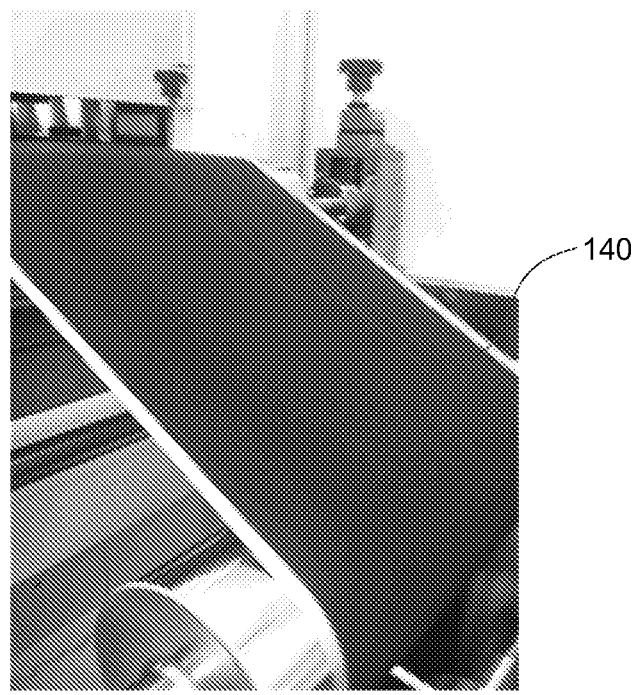
FIG. 3F depicts another example of a heat treated safe layer consistent with implementations of the current subject matter.

As noted, in some implementations of the currents subject matter, the structural integrity of the safe layer 140 may be enhanced by at least subjecting the safe layer 140 to a chemical treatment, heat treatment, and/or radiation treatment (e.g., exposure to ultraviolet (UV) light, β-ray, X-ray, and/or the like). For example, the safe layer 140 may be heat treated in order to minimize the quantity of cracks present in the safe layer 140. As shown in FIG. 3F, heat treating the safe layer 140 at 150° C. for 16 hours and under vacuum may render the safe layer 140 crack-free.

In some implementations of the current subject matter, the safe layer 140 may be formed together with the first electrode 110a. To form the first electrode 110a, a polyvinylidene fluoride (PVDF) solution may be formed by combining 15 grams of polyvinylidene fluoride (PVDF) and 172.5 grams of N-Methyl-2-pyrrolidone (NMP) solvent. Furthermore, 10 grams of carbon black may be mixed with the polyvinylidene fluoride (PVDF) solution first at 1000 revolutions per minute for ten minutes and then at 8000 revolutions per minute for 60 minutes. The polyvinylidene fluoride (PVDF) solution may be combined with 970 grams of lithium cobalt oxide ($LiCoO_2$) as well as some quantity of N-Methyl-2-pyrrolidone (NMP) solvent before being mixed for a total of two hours in which the polyvinylidene fluoride (PVDF) solution subject to 10 minutes of being mixed at 1000 revolutions per minute for every 30 minutes of being mixed at 6000 revolutions per minute.

The viscosity of the resulting slurry may be determined by a rheometer (e.g., at fitted with spindle no. 6 and set at 50 revolutions per minute). Moreover, additional quantities of N-Methyl-2-pyrrolidone (NMP) may be added to the slurry in order to achieve a viscosity of approximately 2500 centipoise (cP) and a final solid content of approximately 66.7%. Once the slurry is determined to exhibit the desired viscosity and solid content, an automatic coater may form the first electrode 110a by at least coating the slurry on a surface of the safe layer 140 at a rate of 2 meters per minute and with a target loading of approximately 20 milligrams per square centimeter. The first drying zone of the automatic coater may be set to 70° C., the second drying zone of the automatic coater may be set to 100° C., the third drying zone of the automatic coater may be set to 120° C., the fourth drying zone of the automatic coater may be set to 140° C., the fifth drying zone of the automatic coater may be set to 130° C., and the sixth drying zone of the automatic coater may be set to 90° C. It should be appreciated that the first electrode 120a may also be subject to a chemical treatment, heat treatment, and/or radiation treatment (e.g., exposure to ultraviolet (UV) light, β-ray, X-ray, and/or the like) in order to enhance a structural integrity of the first electrode 120a.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A battery cell, comprising:
   a first electrode;
   a second electrode having an opposite polarity as the first electrode; a first current collector electrically coupled with the first electrode;
   a second current collector electrically coupled with the second electrode; and
   a safe layer interposed between the first electrode and first current collector, the safe layer responding to being exposed to a target temperature by at least interrupting a current flow in the battery cell, the safe layer interrupting the current flow in the battery cell by at least decomposing and/or delaminating upon exposure to the target temperature to form a non-conductive gap between the first electrode and the first current collector, the safe layer including polyhedral oligomeric silsesquioxane (POSS) and one or more electrically conductive additives, the one or more electrically conductive additives rendering the safe layer electrically conductive at temperatures below the target temperature, and the safe layer forming the non-conductive gap at the target temperature due to the polyhedral oligomeric silsesquioxane (POSS) decomposing upon exposure to the target temperature.

2. The battery cell of claim 1, wherein the safe layer includes 1% by weight to 99% by weight of polyhedral oligomeric silsesquioxane (POSS).

3. The battery cell of claim 1, wherein the safe layer also decomposes to interrupt the current flow in the battery cell in response to exposure to a target voltage.

4. The battery cell of claim 1, wherein the polyhedral oligomeric silsesquioxane (POSS) is one or more of a glycidyl polyhedral oligomeric silsesquioxane (EP0409), a methacryl polyhedral oligomeric silsesquioxane (MA0735), a TrisilanolPhenyl polyhedral oligomeric silsesquioxane (SO1458), or a OctaMaleamic Acid polyhedral oligomeric silsesquioxane (CA0298).

5. The battery cell of claim 1, wherein the polyhedral oligomeric silsesquioxane (POSS) includes one or more crosslinking agents selected from at least one a derivative of ethylene glycol di (meth) acrylate, a derivative of methyl enebisacrylamide, a formaldehyde-free cross linking agent, and divinylbenzene.

* * * * *